J. F. OSTRANDER.
Revolving Harrow.
No. 8,313. Patented Aug. 26, 1851.
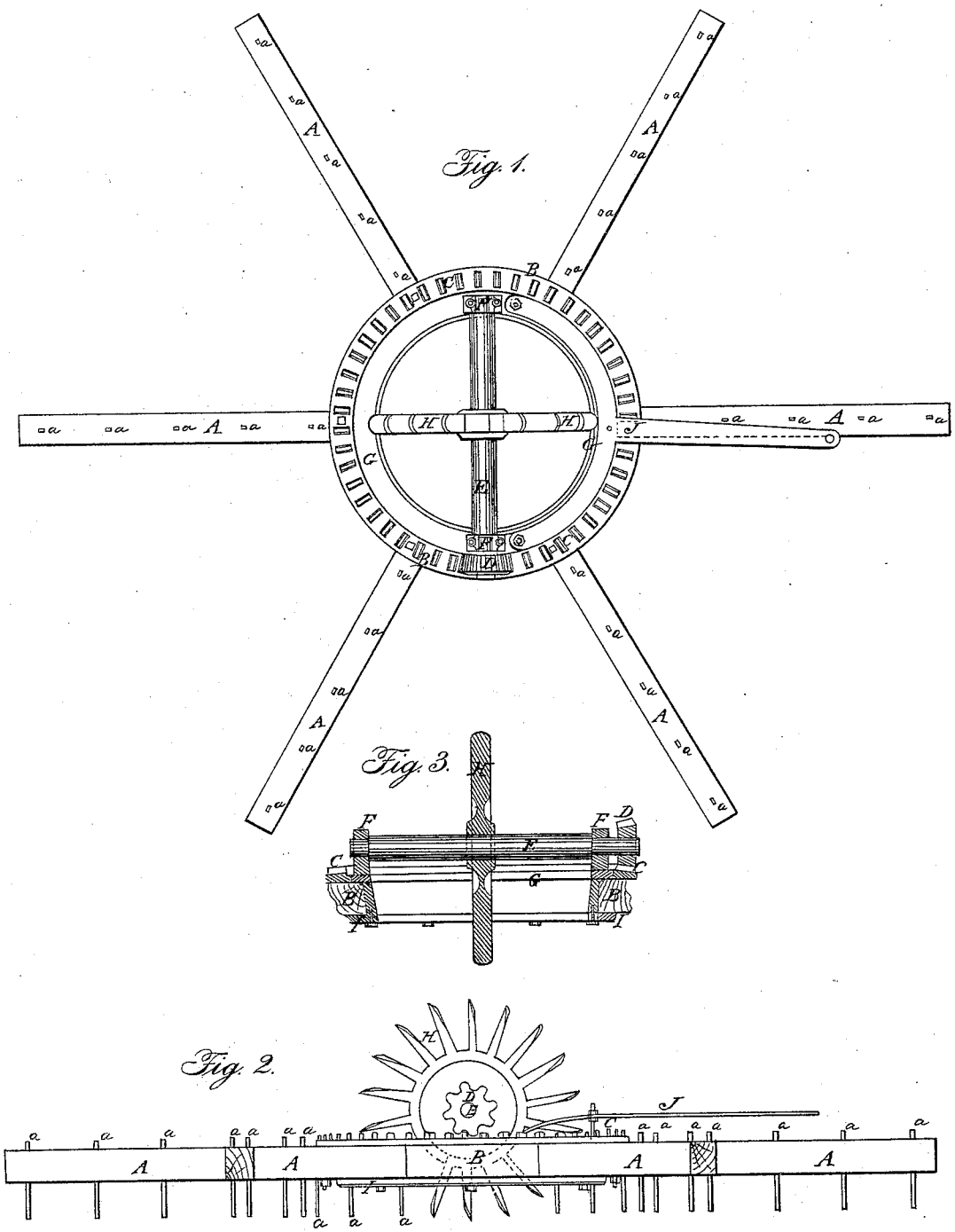

UNITED STATES PATENT OFFICE.

JONA. F. OSTRANDER, OF NEW YORK, N. Y., ASSIGNOR TO A. B. HUTCHINSON AND C. E. HUTCHINSON.

IMPROVEMENT IN ROTARY HARROWS.

Specification forming part of Letters Patent No. 8,313, dated August 26, 1851.

*To all whom it may concern:*

Be it known that I, JONATHAN F. OSTRANDER, of the city, county, and State of New York, have invented a new and useful Improvement in the Construction of Harrows; and I do hereby declare the following to be a full and clear description of the same.

The nature of my invention consists in making a rotating harrow for breaking or harrowing the ground by means of a spur or toothed wheel arranged so as to turn or roll forward in the open center of the harrow-frame when being drawn forward by the horses, and, as it rolls forward, by means of a small cog-wheel on the end of the shaft of the spur-wheel gearing into a face cog-wheel on the harrow-frame, causes it to rotate simultaneously with its forward motion.

To describe my invention more particularly, I will refer to the accompanying drawings, making a part of this specification, the same letters in the several parts referring to the same parts wherever they occur.

Figure 1 is a perpendicular or bird's-eye view of the harrow. Fig. 2 is a side view of the same. Fig. 3 is a cut section of the same, omitting the arms of the harrow.

Letters A A, &c., are the arms of the harrow, made of wood or other suitable material and having any required number of teeth, *a a*, &c., in them that may be required. These arms are attached to a circular frame, B, in a secure manner—somewhat like the spokes to the hub of a cart-wheel, and operate in an analogous manner by rotating on a ring or hollow axis. On the upper side of this circular frame B is placed a face cog-wheel, C, which gears into a small cog-wheel, D, on the end of the spur-wheel shaft E. This shaft extends across the circular frame B, and is supported by two posts or journals, F F, attached to the ring or hollow axis G. On this shaft is also the spur-wheel H, which is made of any suitable material and size, and having any number of teeth for the purpose of taking hold of the ground as it rolls forward to the dragging motion of the entire harrow, and thereby cause the cog-wheel D to rotate and carry round the circular frame B and arms A A, &c., attached to it on the groove cut in the periphery of the hollow axis G. Letter I is a cap-plate screwed to the lower side of the hollow axis G to hold it in the circular frame B, and at the same time to support and hold the frame B in a horizontal position as it rotates. J is the drag-bar, having a forked end, so as to take hold at the middle, or nearly so, of the hollow axis G for the purpose of keeping the spur-wheel shaft at right angles to the line of action of the harrow.

The operation of the harrow is that when the cap-plate I has been screwed to the under side of the hollow axis G, so as to form a channel-way for supporting the circular frame B and arms A, the harrow is ready for use, and on attaching a yoke of horses or other animals to the end of the drag-bar J will drag the harrow forward, and in doing so cause the spur-wheel H to roll forward on the ends of the spurs, which, holding in the earth, prevent it from slipping, and thereby force the cog-wheel D against the teeth of the face cog-wheel C, so as to give a rotating motion to the circular frame B and arms A simultaneously with the forward motion of the harrow, and in consequence of this double motion more perfectly breaking up or harrowing the ground.

Having now described my invention and the operation of the same, I will proceed to state what I claim and desire to secure by Letters Patent of the United States. What I claim, therefore, is—

The use of the combination of the spur-wheel H and cog-wheel D with the hollow axis G, for the purposes and in mode of construction substantially as herein set forth, and their combination with the circular frame B, having the face cog-wheel C and arms A attached, for the purpose of producing a rotating harrow, substantially in principle of construction as herein set forth.

JONATHAN F. OSTRANDER.

Witnesses:
A. B. HUTCHINSON,
C. E. HUTCHINSON.